United States Patent
Bradley et al.

(10) Patent No.: US 10,615,966 B2
(45) Date of Patent: *Apr. 7, 2020

(54) SELECTIVE CONTENT SECURITY USING VISUAL HASHING

(71) Applicant: International Business Machines Corporation, Armonk, NY (US)

(72) Inventors: Lisa M. W. Bradley, Cary, NC (US); Liam S. Harpur, Dublin (IE); Aaron J. Quirk, Raleigh, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/593,755

(22) Filed: May 12, 2017

(65) Prior Publication Data

US 2018/0331822 A1 Nov. 15, 2018

(51) Int. Cl.
*H04L 9/32* (2006.01)
*H04L 9/06* (2006.01)
(Continued)

(52) U.S. Cl.
CPC ...... *H04L 9/0643* (2013.01); *G06K 19/06037* (2013.01); *H04L 9/3226* (2013.01);
(Continued)

(58) Field of Classification Search
CPC ... H04L 9/0643; H04L 9/3236; H04L 9/3226; H04L 63/102; H04L 63/108;
(Continued)

(56) References Cited

U.S. PATENT DOCUMENTS

| 5,765,176 A | 6/1998 | Bloomberg |
| 6,108,656 A | 8/2000 | Durst et al. |

(Continued)

OTHER PUBLICATIONS

Zauner (Thesis: Implementation and Benchmarking of Perceptual Image Hash Functions, 2010, 107 pages) (Year: 2010).

(Continued)

*Primary Examiner* — Khoi V Le
(74) *Attorney, Agent, or Firm* — Daniel R. Simek (57) ABSTRACT

In an approach to securing data using visual hashing, one or more computer processors receive a user access request for hashed image. The one or more computer processors identify one or more access request parameters for the hashed image. The one or more computer processors determine whether the user access request for the hashed image meets the one or more access request parameters. Responsive to determining that the user access request for the hashed image meets the one or more access request parameters, the one or more computer processors identify one or more user access permissions. The one or more computer processors prepare a modified image of the hashed image corresponding to the identified one or more user access permissions. The one or more computer processors send the modified image of the hashed image corresponding to the one or more user access permissions to a requesting user.

18 Claims, 7 Drawing Sheets

(51) Int. Cl.
*G06K 19/06* (2006.01)
*H04L 29/06* (2006.01)
*H04W 12/08* (2009.01)
*H04W 12/00* (2009.01)

(52) U.S. Cl.
CPC .......... *H04L 9/3236* (2013.01); *H04L 9/3242* (2013.01); *H04L 63/0492* (2013.01); *H04L 63/0861* (2013.01); *H04L 63/102* (2013.01); *H04L 63/108* (2013.01); *H04W 12/08* (2013.01); *H04L 2209/16* (2013.01); *H04W 12/00522* (2019.01)

(58) Field of Classification Search
CPC ............... H04L 9/3242; H04L 63/0861; H04L 63/0492; H04L 2209/16; H04W 12/08; G06K 19/06037
See application file for complete search history.

(56) References Cited

U.S. PATENT DOCUMENTS

| | | | |
|---|---|---|---|
| 6,411,994 | B2 | 6/2002 | van Allen et al. |
| 7,257,585 | B2 | 8/2007 | Stevenson et al. |
| 8,935,777 | B2 | 1/2015 | DeSoto et al. |
| 2004/0025025 | A1* | 2/2004 | Venkatesan ........... G06T 1/0028 713/176 |
| 2004/0123131 | A1* | 6/2004 | Zacks ................ H04N 1/32128 726/27 |
| 2008/0181396 | A1* | 7/2008 | Balakrishnan ...... G06F 17/2276 380/28 |
| 2010/0096448 | A1 | 4/2010 | Melick et al. |
| 2011/0317839 | A1* | 12/2011 | Yoneda ................... H04L 9/085 380/270 |
| 2012/0324397 | A1* | 12/2012 | Patz ....................... G06F 19/321 715/800 |
| 2013/0167208 | A1* | 6/2013 | Shi .......................... H04L 63/18 726/5 |
| 2014/0295754 | A1 | 10/2014 | Lortz et al. |
| 2015/0058229 | A1* | 2/2015 | Wiacek ................... G06F 21/10 705/310 |
| 2015/0063672 | A1 | 3/2015 | Chang |
| 2015/0363605 | A1 | 12/2015 | Plastina |
| 2016/0294781 | A1* | 10/2016 | Ninan ................. H04L 63/0407 |
| 2016/0358043 | A1 | 12/2016 | Mu et al. |
| 2019/0130079 | A1 | 5/2019 | Burriesci et al. |
| 2019/0266033 | A1 | 8/2019 | Sharifi et al. |

OTHER PUBLICATIONS

Bertolami (Perceptual Hashing, May 28, 2014, 7 pages) (Year: 2014).

Appendix P, List of IBM Patents or Patent Applications Treated As Related, 2 pages, dated Jan. 31, 2018.

Bradley et al., "Selective Content Security Using Visual Hashing", U.S. Appl. No. 15/838,939, filed Dec. 12, 2017, 38 pages.

Mell et al., "The NIST Definition of Cloud Computing", Recommendations of the National Institute of Standards and Technology, NIST Special Publication 800-145, Computer Security DivisionInformation Technology Laboratory, National Institute of Standards and Technology, Gaithersburg, MD 20899-8930, Sep. 2011, 7 pages.

* cited by examiner

FIG. 3 indices cross-loading onto other subscales with a focus on the individual, for example, with ARM 2 (...is a good role model for me to follow).Perhaps IC2 identifies the individual but does not distinguish enough with regard to differences in individual needs, which is inherent in individual consideration. Thus, IC2 was removed and the subsequent fit of the pairwise models was found to be improved with only one model (IC and IM) and having an inadequate fit. Of the other four problem models (all including inspirational motivation), no theoretical rationale cloud be identified for the deletion of problem items. Consequently, with 17 out of 21 pairs fitting well the full model was run[1]

| PrintVersionFor | OriginalSection | Allowed_Hash | ACL Level | CodeRequiredToUnlock |
|---|---|---|---|---|
| User1 | Doc326Page4Para5 | 424c,632234a,85b | reader | 456846340985762000 |
| User2 | Doc832Page34Para3 | 3456b,84a,6363d | reader | 7465767643755290 |
| User3 | Doc345Page8Para55 | 8564a,63463,7631e | reader | 452765874597460000 |
| User3b | Doc9000Page454Para4 | 585a,633d | reader | 459878734545-874722 |
| User3c | Doc8432Page1Para324 | 972d | editor | 452345676976893000 |
| User4 | Doc832Page4Para5 | 45254c,523b,65463a | reader | 879737456627365000000 |

SELECTIVE CONTENT SECURITY USING VISUAL HASHING

BACKGROUND OF THE INVENTION

The present invention relates generally to the field of hashing, and more particularly to the field of visual hashing as a security measure.

Generally, hashing transforms a string of characters into a shorter fixed-length value or key that represents the original string. Hashing is used to index and retrieve items in a database faster than methods using original values by finding the item using the shorter hashed key than to find the item using the original value. Visual hashing uses an image, such as a segment of text, a photograph, or any other visual medium, to assign a hash value to quickly identify characteristics, such as user permissions and image content classifications, associated with the image.

Hashing is also used in many encryption algorithms. By assigning hash keys to a particular segment of text or an image, a program may identify permissions associated with the hash key by processing the one or more hash keys through one or more encryption algorithms. In the case of visual hashing, the hash key is determined by key characteristics of an image such as the composition which may include, among many other characteristics, the colors and the placement of light and dark areas. Using the assigned hash key associated with a particular image, the one or more hash keys can be inserted into and encryption algorithm to produce a particular result, such as determining whether a user attempting to access information hidden in the image has access authorization.

SUMMARY

Embodiments of the present invention disclose an apparatus, a method, and a computer program product for securing data using visual hashing. The method may include one or more computer processors receiving a user access request for hashed image. The one or more computer processors identify one or more access request parameters for the hashed image. The one or more computer processors determine whether the user access request for the hashed image meets the one or more access request parameters. Responsive to determining that the user access request for the hashed image meets the one or more access request parameters, the one or more computer processors identify one or more user access permissions. The one or more computer processors prepare a modified image of the hashed image corresponding to the identified one or more user access permissions. The one or more computer processors send the modified image of the hashed image corresponding to the one or more user access permissions to a requesting user.

DETAILED DESCRIPTION

There are existing ways to leverage technologies such as near field communication, quick response (QR) codes, radio frequency identification, and other technologies to allow a mobile device to access and/or download a resource. For example, an advertisement may contain a QR code which enables a user to scan the QR code to be directed to a company website. This technique is useful to dynamically convey information to a user. However, there are many instances where the owner of particular content may not want the information to be shared broadly or downloaded for future use. Instead, the owner of the content may desire restrictions on accessing the content based on owner-managed parameters, such as in the presence of the source media. For example, an owner of such content may only desire for a trade article to be accessed for a limited amount of time and within the bounds of a trade show or a particular booth in a trade show.

As the amount of information accessed and shared by personal client computing devices increases, there exists a need for technology allowing for greater control over the dissemination of media in any format. By incorporating visual hashing in the existing field of encryption, the information security can be enhanced by controlling the dissemination of sensitive information based on preconfigured parameters. Implementation of embodiments of the invention may take a variety of forms, and exemplary implementation details are discussed subsequently with reference to the Figures.

Figure 1:
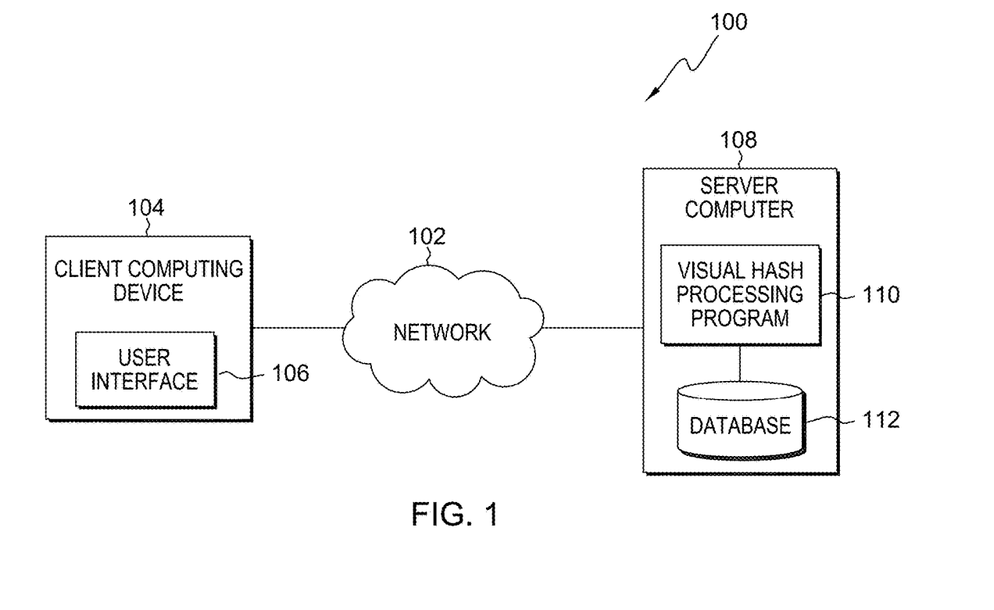
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104 and server computer 108, and other client computing devices (not shown) within distributed data processing environment 100.

Client computing device 104 can be a laptop computer, a tablet computer, a smart phone, or any programmable electronic client computing device capable of communicating with various components and devices within distributed data processing environment 100, via network 102. In general, client computing device 104 represents any programmable electronic client computing device or combination of programmable electronic client computing devices capable of executing machine readable program instructions, manipulating executable machine readable instructions, and communicating with server computer 108 and other client computing devices (not shown) within distributed data processing environment 100 via a network, such as network 102. Client computing device 104 includes an instance of user interface 106. Client computing device 104 and user interface 106 allow a programmer to send visually hashed images to visual hash processing program 110.

User interface 106 provides an interface to visual hash processing program 110 on server computer 108 for a user of client computing device 104. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and server computer 108. Mobile application software, or an "app," is a computer program designed to run on smart phones, tablet computers and other mobile devices. In an embodiment, user interface 106 enables the user of client computing device 104 to register with send visually hashed images to visual hash processing program 110 to access visually hashed content on client computing device 104.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any other programmable electronic device capable of communicating with client computing device 104 and other client computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes visual hash processing program 110 and database 112. Server computer 108 may include internal and external hardware components, as depicted and described in further detail with respect to FIG. 5. In other embodiments, server computer 108 and client computing device may be implemented in a cloud-based environment, as depicted and described in further details with respects to FIG. 6 and FIG. 7.

Visual hash processing program 110 resides on server computer 108 and initiates when visual hash processing program 110 receives data, such as a text document, from a user. A user may upload one or more documents into database 112 in advance for later retrieval by visual hash processing program 110. Visual hash processing program 110 receives one or more user-defined hashing parameters associated with the data. Data may include any medium that can be hashed, such as images and text. Based on the user-defined hashing parameters, visual hash processing program 110 hashes the one or more documents according to the user-defined hashing parameters. Finally, visual hash processing program 110 assigns one or more hash values based on the format of the hashed document.

Following the hashing of a document and assigning of an unlock code to the hashed document, visual hash processing program initiates a reversal of the hashing of one or more documents when visual hash processing program 110 receives one or more user access requests. For example, a user access request may be an image of a blurred section of text on a physical copy of the text sent to visual hash processing program 110. Visual hash processing program 110 identifies one or more access request parameters associated with the user access request. In some embodiments, access request parameters may include one or more sets of required circumstances that must be met before a user may request access. Examples of required circumstances may include falling within a required period of time, a required set of dates, and a required geolocation within a designated area for access. In another example, required circumstances may also include falling within a particular proximity to other approved users. However, required circumstances may be any measurable parameters associated with a user access request. Access request parameters may be directly associated with the user or comprise general parameters surrounding the user access request. For example, access request parameters may include the time of day, the geolocation associated with the user access request, and the proximity of the user to other users accessing the hashed data. Visual hash processing program 110 determines whether the one or more user access requests meet the one or more access request parameters. Responsive to determining that the one or more user access requests do not meet the one or more access request parameters, visual hash processing program 110 ends. Responsive to determining that the one or more user access requests meet the one or more access request parameters, visual hash processing program 110 identifies user access permissions. User access permissions may be stored on a database, such as database 112, which may contain hash values associated with the user access request in relation to access request parameters. Visual hash processing program 110 locates data corresponding to the user access permissions based on assigned hash values. Following visual hash processing program 110 locating the data corresponding to the user access permissions, visual hash processing program 110 sends data corresponding to the user access permissions to a requesting device. Visual hash processing program 110 is depicted and described in further detail with respect to FIG. 2.

Database 112 is a repository for data used and stored by visual hash processing program 110. In the depicted embodiment, database 112 resides on server computer 108. In another embodiment, database 112 may reside elsewhere within distributed data processing environment 100 provided visual hash processing program 110 has access to database 112. A database is an organized collection of data. Database 112 can be implemented with any type of storage device capable of storing data and configuration files that can be accessed and utilized by server computer 108, such as a database server, a hard disk drive, or a flash memory. Database 112 stores required access request parameters, user access permissions, and data corresponding to user access permissions of a client computing device, such as client computing device 104. Database 112 also stores registration and configuration data inputted by a user of client computing device 104 via user interface 106 for the purpose of providing visual hash processing program 110 the means to identify a user and the associated user access permissions. Database 112 may also store data associated with the historical access request parameters, user access permissions, and data corresponding to user access permissions of client computing device 104.

Figure 2:
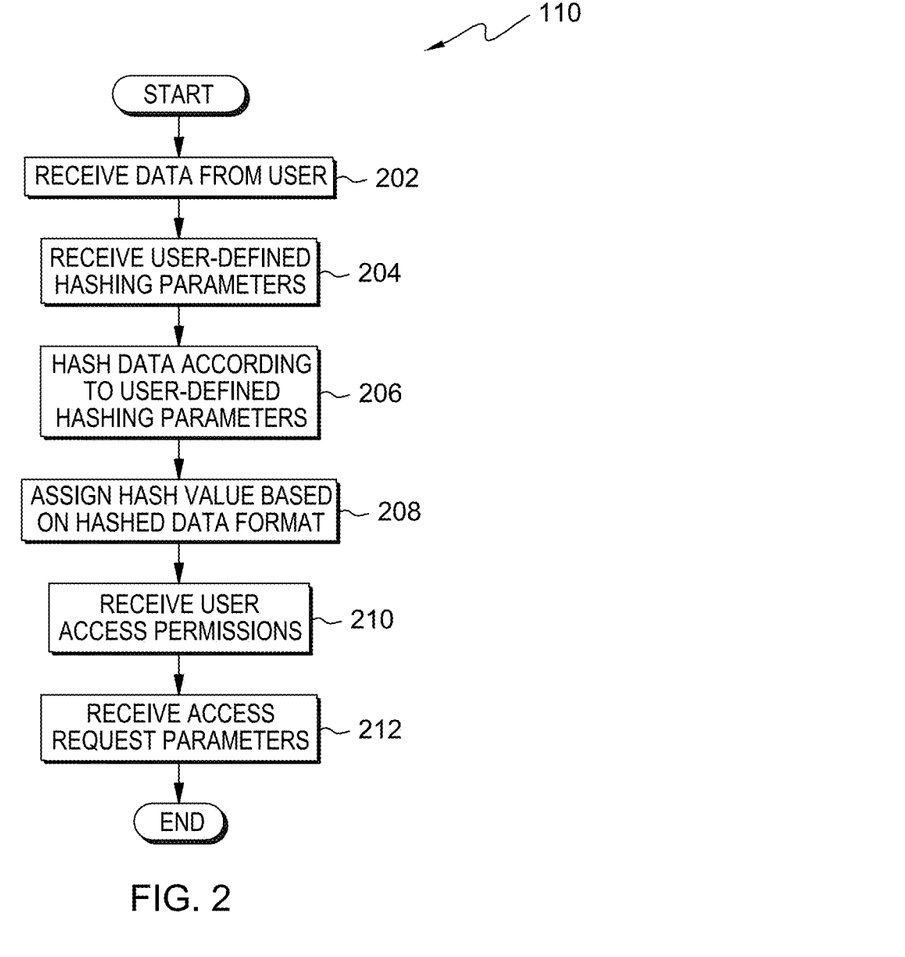
FIG. 2 is a flowchart depicting the operational steps of a first function of a visual hash processing program, on a server computer within the distributed data processing environment of FIG. 1, for hashing data, receiving parameters associated with the hashed data, and assigning hash values, in accordance with an embodiment of the present invention.

FIG. 2 is a flowchart depicting operational steps of a first function of visual hash processing program 110, on server computer 108 within distributed data processing environment 100 of FIG. 1, a program for assigning and unlock passcode based on a visual hash, in accordance with an embodiment of the present invention. The first function of visual hash processing program 110 starts when visual hash processing program 110 receives a document request from a user.

Visual hash processing program 110 receives data from a user (step 202). A user may include the owner of the data and any secondary users. For example, the owner may be "User1" in user list 404 and secondary users may include the remaining listed users. Data may include text documents and images. Data is not limited to the embodiments discussed herein and may be in any format. In one embodiment, visual hash processing program 110 receives a text document containing sensitive or user-specific information. For example, visual hash processing program 110 may receive a legal document containing confidential information, such as an unedited document associated with a document number, page number, and paragraph number listed in original section 405 depicted in further detail in FIG. 4, relevant to a first user, such as a client, and a second user, such as the client's legal counsel. In another embodiment, visual hash processing program 110 receives an image containing sensitive or user-specific information. For example, visual hash processing program 110 may receive an image of various pieces of evidence relevant to a first user on user list 404, such as a client's legal counsel, and to a second user on user list 404, such as, a client's opposing counsel. In yet another embodiment, visual hash processing program 110 may receive a combination of text documents and images containing sensitive or user-specific information. For example, visual hash processing program 110 may receive proprietary instruction manual and images for a prototype relevant to one or more users, such as engineers in a technology company.

Visual hash processing program 110 receives user-defined hashing parameters (step 204). User-defined hashing parameters may be set by owners of the data and/or authorized users of the data. In one embodiment, user-defined hashing parameters may include setting one or more data hashing methods. For example, visual hash processing program 110 may receive instructions to hash a portion of a text document by blurring the document. In another example, visual hash processing program 110 may receive instructions to hash a portion of text by obfuscating the text with a random pattern of lines overlaying the original text. In another embodiment, user-defined hashing parameters may include setting a level of data hashing. For example, visual hash processing program 110 may receive instructions to blur a portion of a text document so that twenty percent of the pixels match the original document and the remaining portion are distributed randomly. In another example, visual hash processing program 110 may receive instructions to obfuscate a portion of text so that eighty percent of a text document in covered by the random pattern of lines overlaying the original text. The aforementioned user-defined hashing parameters may be implemented individually or in any combination. Further, user-defined hashing parameters may include any parameters associated with the processing of data.

Visual hash processing program 110 hashes the data according to the user-defined hashing parameters (step 206). In an embodiment, visual hash processing program 110 may hash a portion of a text document by partially blurring the document, such as blurred text 402 depicted in FIG. 4. For example, visual hash processing program 110 may blur a portion of a text document (e.g., blurred text 402) so that twenty percent of the pixels match the original document and the remaining portion are distributed randomly. In another embodiment, visual hash processing program 110 may hash a portion of text by obfuscating the text with a random pattern of lines overlaying the original text. In another example, visual hash processing program 110 may obfuscate a portion of text so that eighty percent of a text document in covered by the random pattern of lines overlaying the original text.

Figure 4:
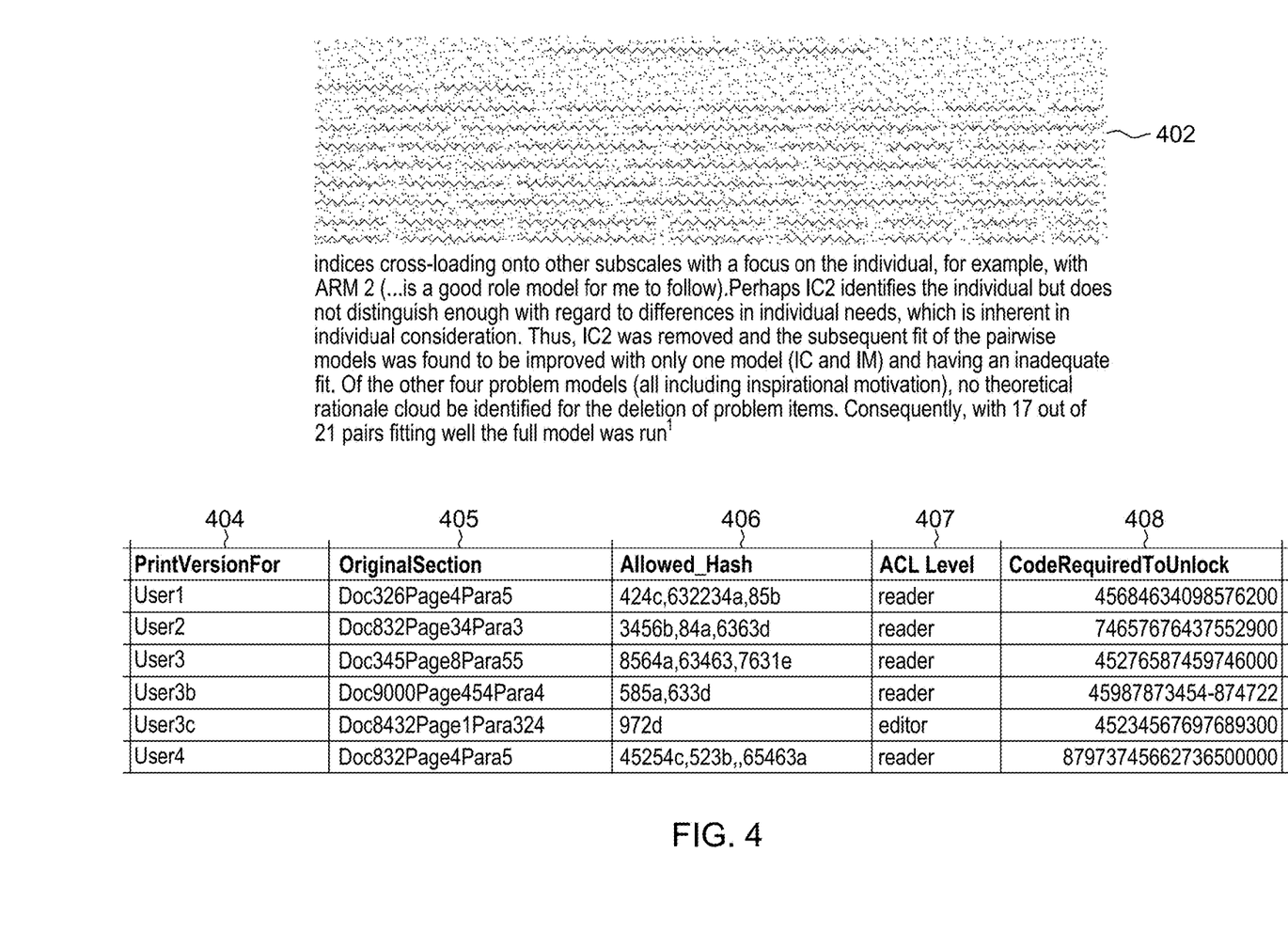
FIG. 4 depicts an illustration of a hashed document and accompanying hash values, in accordance with an embodiment of the present invention.

Visual hash processing program 110 assigns a hash value based on the hashed data format (step 208). The hashed data format may include any individual or combination characteristics of the hashed data and characteristics of data surrounding the hashed data resulting from the application of data hashing methods. In an embodiment, visual hash processing program 110 may assign a hash value based on the characteristics of a blurred text. For example, visual hash program may assign a value based on the number of characters blurred per line, the justification associated with the line, and the spacing following the line. To illustrate the aforementioned example, visual hash processing program 110 may assign a blurred text with three lines a hash value of 15C224L230L. The numbers 15, 24, and 30 refer to the number of characters. The letters "C", "L", and "L" refer to the justification (e.g., left, center, and right). Lastly, the numbers 2 and 2 remaining indicate the spacing between the lines. As a result, visual hash processing program 110 may assign the unique hash value to the blurred text. The unique hash values assigned to the blurred text may be compiled to create a list of allowed hash values associated with a user, as illustrated by allowed hash list 406.

In another embodiment, visual hash processing program 110 assigns a hash value based on the characteristics of the blurred text and the formatting of the surrounding elements, such as titles, page numbers, and colors. For example, visual hash processing program 110 may assign a hash value based on the characteristics of the hashed data in a pamphlet as well as the characteristics of the surrounding text, such as the formatting of the title, the color of the page, and the page number associated with the hashed data. Further illustrating this example, a pamphlet containing the same hashed data may be selectively blurred and unblurred depending on the hash values associated with one version of the pamphlet with a title stating "Manufacturers" and another version of the same pamphlet with a title stating "Distributors".

Hash values may include alphanumeric reference codes corresponding to particular permissions associated with hashed data which may be compiled to an entry with hash values associated with an unlock code for a user of visual hash processing program 110. Based on the hash value associated with the unique physical layout and formatting of a particular set of data, such as a page in a trade show pamphlet, visual hash processing program 110 may identify an unlock code which grants access to one or more visually hashed portions of the particular set of data. However, the aforementioned example illustrated only on embodiment and assigning a hash value may be achieved by any method known in the art. Further, the hash value is not limited to the embodiments herein may be determined using any variables associated with the hashed data format.

Visual hash processing program 110 receives user access permissions (step 210). In an embodiment, user-defined hashing parameters may include setting one or more user access permissions. For example, visual hash processing program 110 may receive a list of identification numbers associated with different groups of users, such as user list 404. Further, visual hash processing program 110 may receive subset of user access permissions regarding the same set of data respective to each group of users, such as allowed hash list 406 depicted in FIG. 4. As a result, visual hash processing program 110 sets one or more user access permissions. For example, visual hash processing program 110 may record identification numbers associated with different groups of users into database 112. Further, visual hash processing program 110 may record one or more subsets of user access permissions regarding the same set of data respective to each group of users.

Visual hash processing program 110 receives access request parameters (step 212). In an embodiment, user-defined hashing parameters may include setting one or more access request parameters. For example, visual hash processing program 110 may receive a specific time range, such as from 7:00 A.M. to 5:00 P.M., a specific date range, such as from Jul. 4, 2017 to Jul. 10, 2017, and a specific location, such as geographic coordinates, that limit the circumstances of data access. As a result, visual hash processing program 110 sets the one or more access request parameters. For example, visual hash processing program 110 may set a specific time range, such as from 7:00 A.M. to 5:00 P.M., a specific date range, such as from Jul. 4, 2017 to Jul. 10, 2017, and a specific location, such as geographic coordinates, that limit the circumstances of data access.

Following receiving access request parameters (step 212), the first function of visual hash processing program 110 ends.

Figure 3:
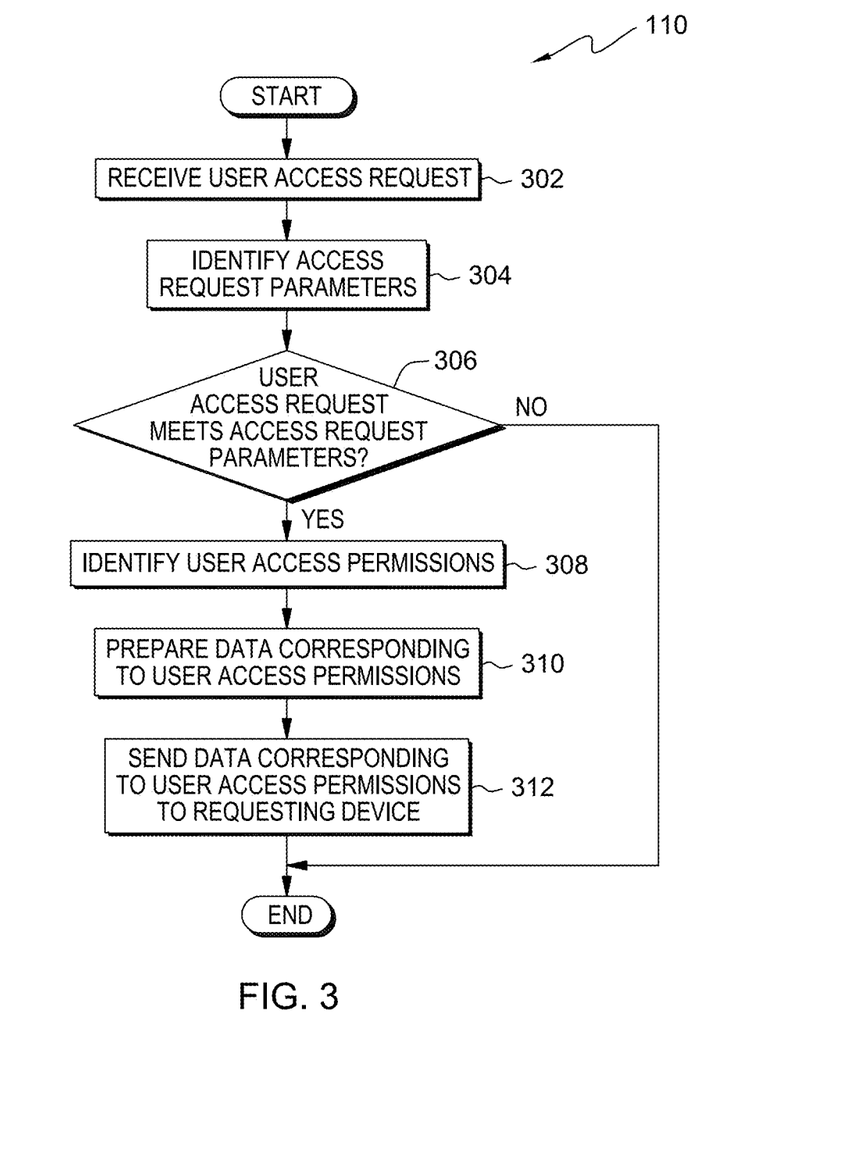
FIG. 3 is a flowchart depicting operational steps of a second function of a visual hash processing program, on a server computer within the distributed data processing environment of FIG. 1, for determining whether to access hashed data, in accordance with an embodiment of the present invention.

FIG. 3 is a flowchart depicting operational steps of a second function of visual hash processing program 110, on server computer 108 within distributed data processing environment 100 of FIG. 1, a program for retrieving data based on user access permissions associated with visual hashes, in accordance with an embodiment of the present invention. The second function of visual hash processing program 110 starts when visual hash processing program 110 receives a user access request.

Visual hash processing program 110 receives one or more user access requests (step 302). Visual hash processing program 110 may receive one or more user access requests in any data format sent through a computing device. For example, the one or more user access requests may be a request from a user through a smartphone to access section of text, such as original section 405. In one embodiment, a user access request may be a blurred image of text. For example, the data may be a blurred image on a printed trade show pamphlet that blurs fundamental concepts. The fundamental concepts are available in a non-blurred form of the image that was previously received by the visual hash processing program 110 on server computer 108 in step 202. In this example, the blurred image accurately reflects the formatting and general visual characteristics, such as spacing and length, of the original text. In another embodiment, a user access request may be an image of a section of text in a printed pamphlet blurred by a particular visual hash that does not reflect the formatting of the original text. For example, the blurring covers a portion of text of a trade show pamphlet that displays a particular pattern associated with particular hash values. Hash values may be any representation, such as alphanumerical codes, associated with a user access request corresponding to the desired information. However, a user access request is not limited to the types of data described herein and may be a request associated with any type of data known in the art.

Visual hash processing program 110 identifies one or more access request parameters associated with the user access request (step 304). Access request parameters may be directly associated with the user or comprise general parameters surrounding the user access request. For example, access request parameters may include a required set of circumstances surrounding a user access request, such as requiring the request to be made between certain hours by an authorized individual on a particular date. Additionally, the access request parameters may be tailored to different user circumstances. In one embodiment, an access request parameter may include a preconfigured set of times in a day within which a user may request access to hashed data. For example, access request parameters may require a user to request access to a blurred section of a flyer located outside of a business between the hours of 5:00 P.M. and 9:00 A.M. in order to provide access to hashed data by particular customers outside of the regular business hours. In another example, access request parameters may allow users to request access to a first, second, and third blurred section of text on a menu outside of an exclusive restaurant at a first, second, and third time frame corresponding to the blurred sections of text in order to allow customers with reservations to access the breakfast menu in the morning, the lunch menu in the afternoon, and the dinner menu at night, such as "User3", "User3b", and "User3c" depicted in user list 404 discussed in further detail below.

In another embodiment, access request parameters may include one or more preconfigured locations within which a user may request access to hashed data. For example, access request parameters may require a user to be present within a 300-foot radius of a convention center to access hashed data on a trade show pamphlet. In another example, access request parameters may require a user to be within the bounds of a law firm in order to access blurred text on confidential legal documents. In yet another embodiment, access request parameters may be a preconfigured vicinity of a user to other users who have accessed or are attempting to access hashed data. For example, access request parameters may require a user to be present within one or more other users accessing or attempting to access the hashed data to access hashed data on a trade show pamphlet. However, access request parameters are not limited to the embodiments described herein and may be any configurable variable or combination or variables limiting or granting access to hashed data by one or more users.

Visual hash processing program 110 determines whether the one or more user access requests meet the one or more access request parameters (decision block 306). Determining whether the user access request for the hashed data meets the one or more access request parameters may be achieved by determining whether a set of circumstances surrounding the user access request matches or falls within one or more sets of required circumstances associated with one or more access request parameters. Visual hash processing program 110 may determine user hash values associated with the user access request such as the hash values associated with a particular blurred image by analyzing the general spacing, length, and any other identifiable characteristics of the text within the image. For example, visual hash processing program 110 may determine the hash values by analyzing the hashed data format to extract the hash value based on characteristics of the data using a method substantially similar to step 208. After determining the hash values, which define the circumstances allowing access to hashed data and sending of the hashed data to approved users, visual hash processing program 110 determines whether the user access request falls within the access request parameters by determining user access permissions associated with the user and the requested unhashed data. In an embodiment, determining whether the user access request for the hashed data meets the one or more access request parameters is achieved by determining whether a time, a date, and a geolocation associated with a user access request falls within a required period of time, a required set of dates, and a required geolocation within a designated area for access. For example, after determining the hash values associated with a request for an unhashed pamphlet by multiple users with different user permissions, visual hash processing program 110 may determine that two of three groups of trade show attendees fall into an approved category of users, such as the resellers and manufacturers, based on the time of the day, the date, and location corresponding to the trade show.

Responsive to visual hash processing program 110 determining that the one or more user access requests do not meet the access request parameters ("No" branch, decision block 306), visual hash processing program 110 ends.

Responsive to visual hash processing program 110 determining that the one or more user access requests meet the access request parameters ("Yes" branch, decision block 306), visual hash processing program 110 identifies user access permissions (step 308). User access permissions may be particular permissions associated with the hashed data based on the type of user requesting access. For example, visual hash processing program 110 may determine that a particular segment of blurred text in a trade show pamphlet (e.g., original section 405) may be unhashed based on user permissions associated with the requesting user (e.g., text corresponding to "424c,632234a,85b" in allowed hash list 406) and sent to a trade show attendee (e.g., user1 in user list 404). In an embodiment, visual hash processing program may identify different user access permission for a first user and a second user attempting to access the hashed data, such as visually hashed data. For example, employee A and employee B in a law firm may make the same user access request for information from a blurred section of a confidential legal document, and, based on the respective roles of employee A and employee B, visual hash processing program 110 may determine that visual hash processing program may allow employee B to access a first set of information, such as the case law and proposed arguments, and employee A may be allowed to access a second set of information on the same document, such as docket numbers.

Visual hash processing program 110 prepares the data corresponding to the user access permissions (step 310). Visual hash processing program 110 may prepare the data based on user access permissions corresponding to a user, such as allowed hashes on allowed hash list 406. In an embodiment, visual hash processing program 110 may prepare modified data with unobfuscated portions of data corresponding to the user access permissions, such as unblurred text, corresponding to user access permissions, such as security clearance levels associated with subsets of users, on database 112. For example, visual hash processing program 110 may prepare the non-blurred text associated with the user access permissions corresponding to the visual hash created by the blurred image on a database. In another example, visual hash processing program 110 may identify particular user access permissions corresponding to a lawyer attempting to access blurred portions of a legal document. As a result, visual hash processing program 110 may retrieve non-blurred data in a database corresponding to hash values associated with the lawyer. In another embodiment, visual hash processing program 110 may also require the user to send a code, such as a password corresponding to the user in code list 408, to unhash data corresponding to user access permissions.

After preparing the data corresponding to the user access permissions, visual hash processing program 110 sends the data corresponding to the user access permission to one or more requesting devices (step 312). In one embodiment, visual hash processing program 110 may send a request to client computing device 104 to access the data, such as the unblurred text, saved on a database on client computing device 104. For example, a client computing device may have a particular program associated with a trade show containing a hashed database with all of the unblurred text. Visual hash processing program 110 may subsequently send a request containing a passcode to client computing device 104, which inserts the passcode to unlock the hashed file, such as code list 408 depicted in FIG. 4. In another embodiment, visual hash processing program 110 may send the unblurred text to client computing device 104, which a requesting user may subsequently access. In another example, a trade show organizer may provide a smartphone app to attendees containing one or more hashed databases containing the unblurred text. Once visual hash processing program 110 locates and retrieves the unblurred text corresponding to the hash values, visual hash processing program 110 send the data to the attendees' smartphones to be processed by each attendee's smartphone app based on each attendee's user access permissions.

After sending data corresponding to the user access permission to one or more requesting devices, visual hash processing program 110 terminates.

FIG. 4 depicts an illustration of a hashed document and accompanying hash values, in accordance with an embodiment of the present invention. It should be appreciated that FIG. 4 provides only an illustration of one implementation and does not imply any limitations with regard to which different embodiments can be implemented. Many modifications to the depicted embodiment can be made.

In the depicted embodiment, blurred text 402 depicts hashed data associated with a hash value in the form of a half-blurred portion of text. A requesting user may send an image of blurred text 402 to visual hash processing program 110 to request access to hashed data, such as indicated by one or more reference tags listed under allowed hash list 406.

In the depicted embodiment, user list 404 depicts six users with different permissions based on each user's original section 405, allowed hash list 406, and code list 408.

Additionally, user list 404 lists "User3", "User3b", and "User3c". A user may have multiple designations on user list 404 depending on user access permissions and the user access request associated with the user. For example, "User3" may be associated with a user access request from the user made at particular geolocation and time of day, such as a 3:00 P.M. on Apr. 1, 2017 at a trade show in a specific convention center in Los Angeles. "User3b" may be associated with the same user requesting access to one or more documents at the same geolocation but different time of day, such as 6:00 P.M. on Apr. 1, 2017 when an evening session of the trade show begins. Lastly, "User3c" may be associated with a different geolocation and different time of day, such as 10:00 A.M. on Apr. 2, 2017 when the user requests access to documents corresponding an optional paid seminar in an adjacent building to the trade show. However, users may be grouped and separated using any method known in the art and visual hash processing program 110 is not limited to the embodiments disclosed herein.

Additionally, user list 404 may list additional categories classifying particular users. In the depicted embodiment, "User3c" is designated as an editor on classification list 407. However, classification list 407 may classify a user based on any trait. Depending on the classification level, visual hash processing program 110 may dynamically grant or revoke any user access permissions, such as the ability to edit a document listed under original section 405.

Allowed hash list 406 may associate the one or more reference tags with one or more users on user list 404. Multiple reference tags may be assigned to the same image, such as original section 405, to further differentiate user permissions allowing access to particular sections of the image. However, allowed hash list 406 may use any referencing method known in the art to further differentiate user permissions allowing access to particular sections of the image.

In the depicted embodiment, original section 405 lists information corresponding to the location of the unhashed image, such as a document number, a page number, and a paragraph number. In one example, original section 405 allows visual hash processing program 110 to identify a section of a confidential document based on a user access request. Based on the reference tags listed under allowed hash list 406 associated with the user, visual hash processing program 110 may selectively blur and unblur sections of the confidential document referenced by original section 405 based on user access permissions.

In the depicted embodiment, if a requesting user is present on user list 404 and the hash value of blurred text 402 is listed on an allowed hash list 406 corresponding to the user, then visual hash processing program 110 may also require a user to input a code matching the code associated with the user on code list 408. Upon successful entry and matching of the inputted code and the code listed on code list 408, visual hash processing program 110 may allow the user to access the selectively blurred confidential document. Code list 408 may be in any code format and is not limited to the depicted embodiment.

Figure 5:
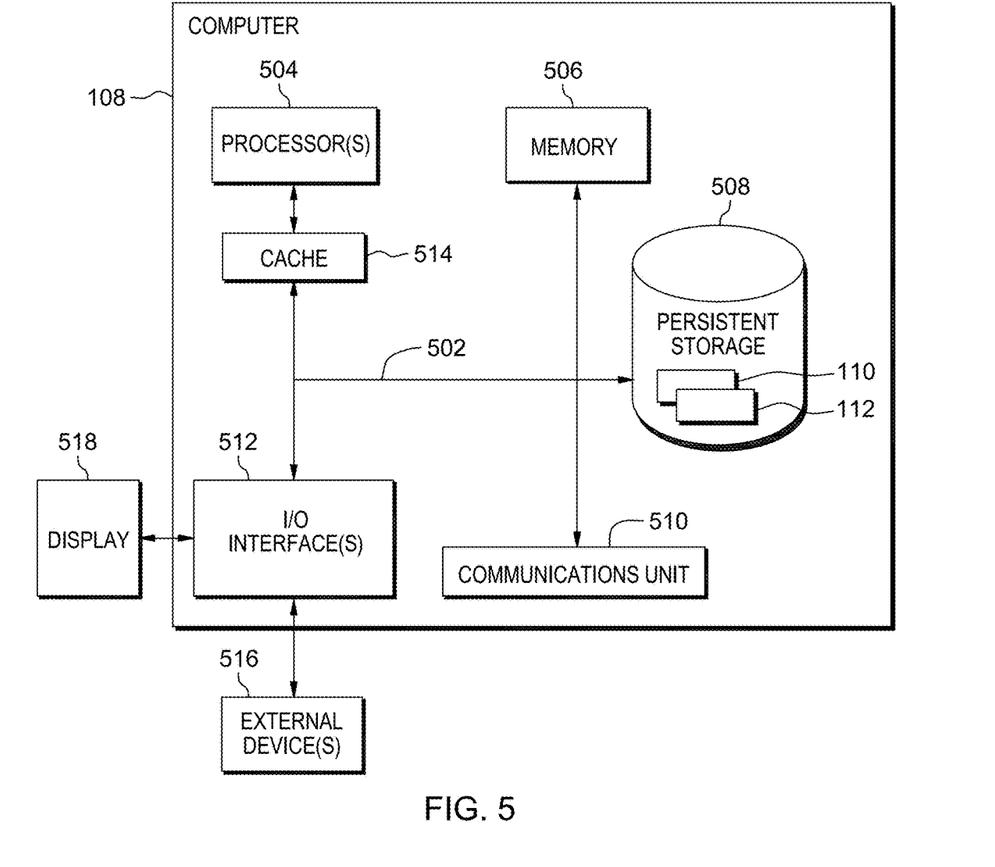
FIG. 5 depicts a block diagram of components of the server computer executing the visual hash processing program within the distributed data processing environment of FIG. 1, in accordance with an embodiment of the present invention.

FIG. 5 depicts a block diagram of components of server computer 108 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server computer 108 can include processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., visual hash processing program 110 and database 112, are stored in persistent storage 508 for execution and/or access by one or more of the respective processor(s) 504 of server computer 108 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of client computing device 104. In these examples, communications unit 510 includes one or more network interface cards. Communications unit 510 may provide communications through the use of either or both physical and wireless communications links. Visual hash processing program 110, database 112, and other programs and data used for implementation of the present invention, may be downloaded to persistent storage 508 of server computer 108 through communications unit 510.

I/O interface(s) 512 allows for input and output of data with other devices that may be connected to server computer 108. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention, e.g., visual hash processing program 110 and database 112 on server computer 108, can be stored on such portable computer readable storage media and can be loaded onto persistent storage 508 via I/O interface(s) 312. I/O interface(s) 512 also connect to a display 518.

Display 518 provides a mechanism to display data to a user and may be, for example, a computer monitor. Display 518 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
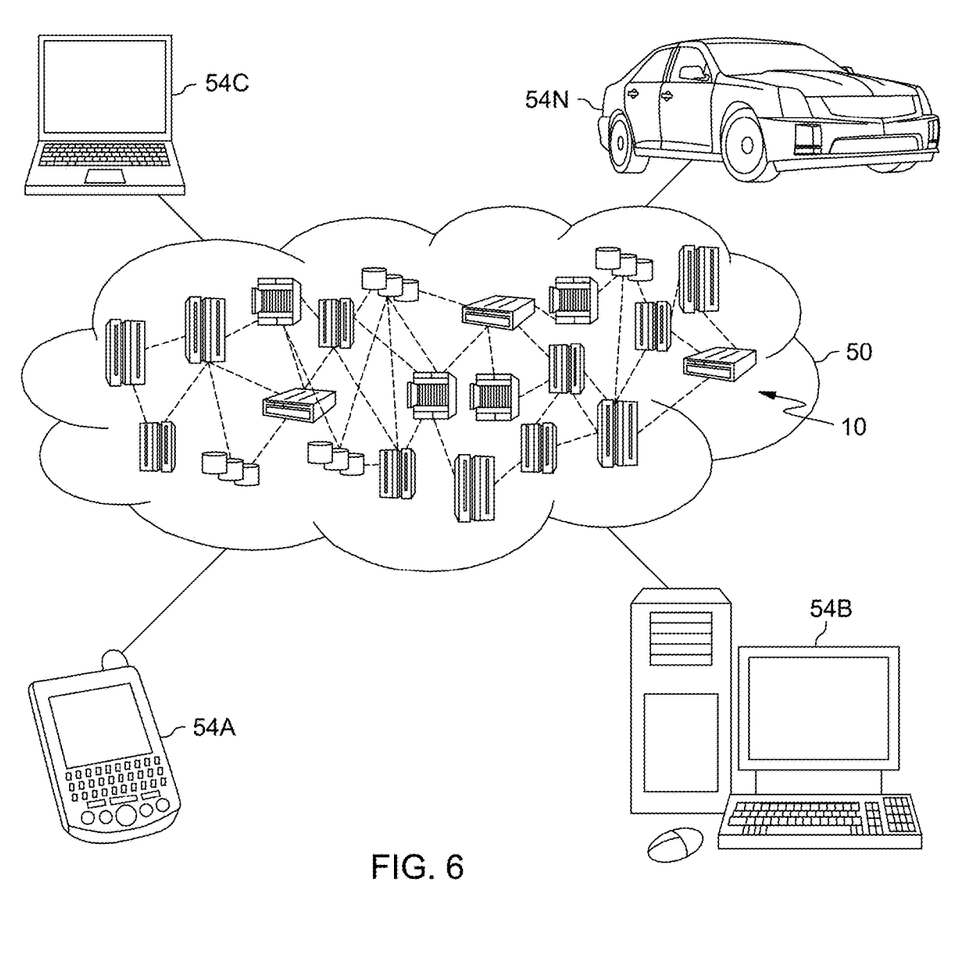
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. Server computer 108 may be one instance of node 10. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 7:
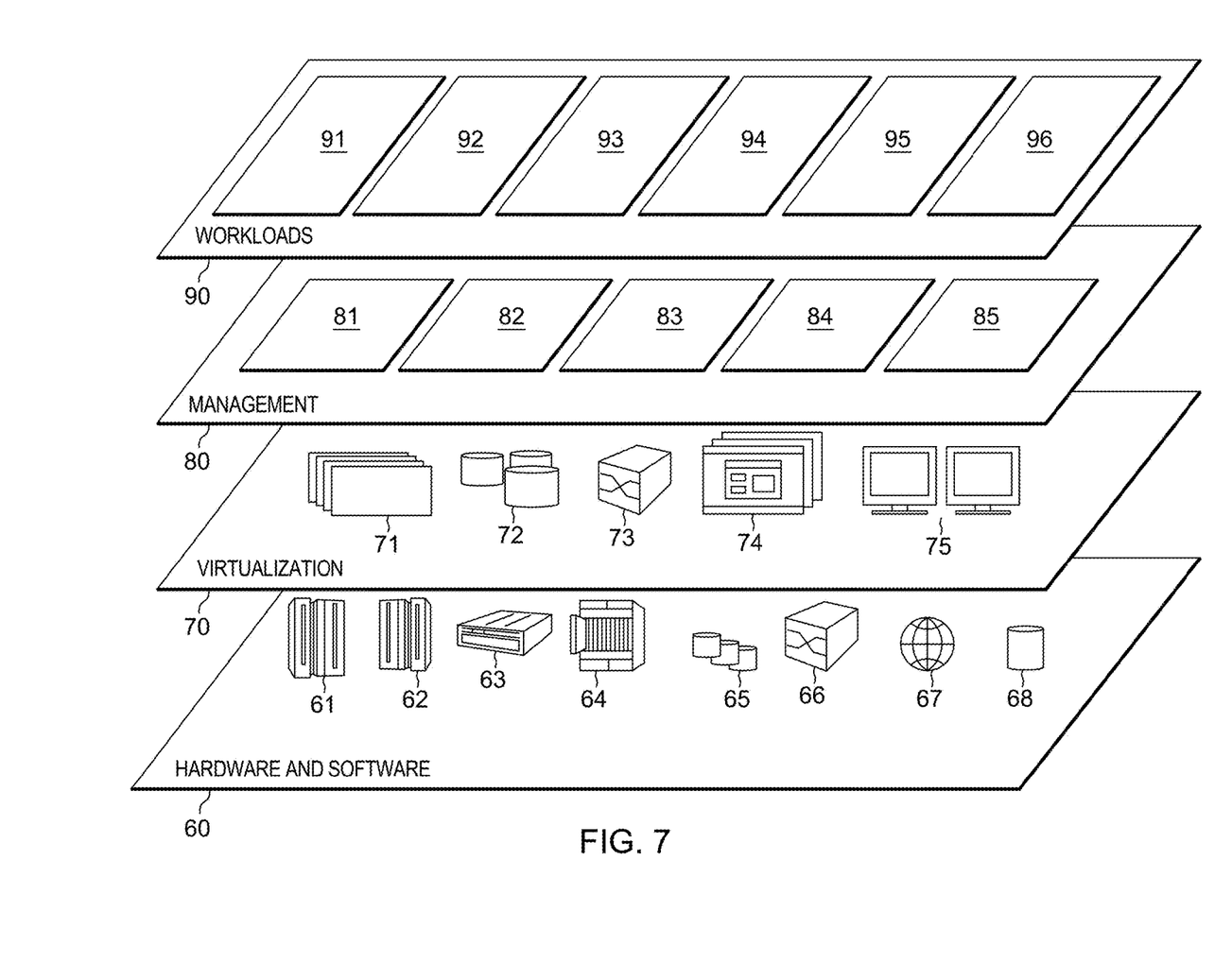
FIG. 7 depicts abstraction model layers according to an embodiment of the present invention.

Referring now to FIG. 7, a set of functional abstraction layers provided by cloud computing environment 50 (FIG. 1) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; visual hash processing 96; and interaction assessment program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for securing data using visual hashing, the method comprising:
   receiving, by one or more hardware processors, a user access request for a hashed image;
   identifying, by the one or more hardware processors, one or more access request parameters for the hashed image;
   assigning, by one or more hardware processors, a hash value based on a format of the hashed image, wherein the hash value is determined using spacing characteristics, a number of letters, and formatting characteristics of a blurred text;
   determining, by the one or more hardware processors, whether the user access request for the hashed image meets the one or more access request parameters;
   responsive to determining that the user access request for the hashed image meets the one or more access request parameters, identifying, by the one or more hardware processors, one or more user access permissions;
   generating, by the one or more hardware processors, a modified image of the hashed image corresponding to the identified one or more user access permissions; and
   sending, by the one or more hardware processors, the modified image of the hashed image corresponding to the one or more user access permissions to a requesting user.

2. The method of claim 1, wherein the one or more access requests parameters are selected from a group consisting of: a time of day, a geolocation associated with a user access request, and a proximity of a user to other users.

3. The method of claim 1, wherein the modified image is selected from a group consisting of: a fully unhashed image, a partially unhashed image, and a fully hashed image.

4. The method of claim 1, further comprising:
   receiving, by the one or more hardware processors, an image from an image owner;
   receiving, by the one or more hardware processors, one or more user-defined hashing parameters selected by the image owner; and
   hashing, by the one or more hardware processors, the data according to the one or more user-defined hashing parameters.

5. The method of claim 4, wherein the one or more user-defined hashing parameters is selected from a group consisting of: image obfuscation, image blurring, a level of image obfuscation, and a level of image blurring.

6. The method of claim 4, further comprising:
   receiving, by the one or more hardware processors, one or more user access permissions associated with the hashed image;
   receiving, by the one or more hardware processors, one or more access request parameters associated with the hashed image; and
   assigning, by the one or more hardware processors, a hash value based on a format of the hashed image.

7. The method of claim 1, wherein the one or more access request parameters are one or more sets of required circumstances surrounding the user access request that are determined by an owner of the data.

8. The method of claim 1, wherein determining whether the user access request for the hashed image meets the one or more access request parameters is achieved by determining whether a time, a date, and a geolocation associated with a user access request falls within a required period of time, a required set of dates, and a required geolocation within a designated area for access.

9. The method of claim 1, wherein preparing a modified image of the hashed image corresponding to the identified one or more user access permissions is achieved by selectively blurring and unblurring at least a portion of the hashed image depending on the one or more user access permissions associated with the user access request.

10. The method of claim 1, wherein preparing a modified image of the hashed image corresponding to the identified one or more user access permission is achieved by selectively blurring and unblurring at least a portion of the hashed image depending on the one or more user access permissions associated with the user access request.

11. A computer program product for securing data using visual hashing, the computer program product comprising:
    one or more computer readable storage devices and program instructions stored on the one or more computer readable storage devices, the stored program instructions comprising:
    program instructions to receive a user access request for hashed image;
    program instructions to identify one or more access request parameters for the hashed image;

program instructions to assign a hash value based on a format of the hashed image, wherein the hash value is determined using spacing characteristics, a number of letters, and formatting characteristics of a blurred text;

program instructions to determine whether the user access request for the hashed image meets the one or more access request parameters;

responsive to determining that the user access request for the hashed image meets the one or more access request parameters, program instructions to identify one or more user access permissions;

program instructions to prepare a modified image of the hashed image corresponding to the identified one or more user access permissions; and program instructions to send the modified image of the hashed image corresponding to the one or more user access permissions to a requesting user.

12. The computer program product of claim 11, wherein the one or more access requests parameters are selected from a group consisting of: a time of day, a geolocation associated with a user access request, and a proximity of a user to other users.

13. The computer program product of claim 11, further comprising:

program instructions to receive an image from an image owner;

program instructions to receive one or more user-defined hashing parameters selected by the image owner; and program instructions to hash the data according to the one or more user-defined hashing parameters.

14. The computer program product of claim 13, wherein the one or more user-defined hashing parameters is selected from a group consisting of: image obfuscation, image blurring, a level of image obfuscation, and a level of image blurring.

15. The computer program product of claim 13, further comprising:

program instructions to receive one or more user access permissions associated with the hashed image;

program instructions to receive one or more access request parameters associated with the hashed image; and program instructions to assign a hash value based on the format of the hashed image.

16. The computer program product of claim 11, wherein determining whether the user access request for the hashed data meets the one or more access request parameters is achieved by determining whether a time, a date, and a geolocation associated with a user access request falls within a required period of time, a required set of dates, and a required geolocation within a designated area for access.

17. The computer program product of claim 11, wherein preparing a modified image of the hashed image corresponding to the identified one or more user access permissions is achieved by selectively obfuscating and unobfuscating a part or all of the hashed data depending on the one or more user access permissions associated with the user access request.

18. The computer program product of claim 11, wherein preparing a modified image of the hashed image corresponding to the identified one or more user access permission is achieved by selectively blurring and unblurring a part or all of the hashed data depending on the one or more user access permissions associated with the user access request program instructions to detect an input pressure using one or more pressure sensors associated with an input medium;

program instructions to determine a pressure value based on an amount of pressure exerted on the input medium; and program instructions to associate the pressure value with each of the one or more physical-pressure based inputs corresponding to the authentication.

* * * * *